United States Patent
Grau

(10) Patent No.: US 10,048,096 B2
(45) Date of Patent: Aug. 14, 2018

(54) DEVICE FOR MEASURING A ROTATIONAL ANGLE BY MODIFYING AND MEASURING THE POLARIZATION OF RADIO WAVES AND USE OF SAID DEVICE

(71) Applicant: Günter Grau, Dorsten (DE)

(72) Inventor: Günter Grau, Dorsten (DE)

( * ) Notice: Subject to any disclaimer, the term of this patent is extended or adjusted under 35 U.S.C. 154(b) by 198 days.

(21) Appl. No.: 14/900,071

(22) PCT Filed: Jun. 18, 2014

(86) PCT No.: PCT/EP2014/062811
§ 371 (c)(1),
(2) Date: Dec. 18, 2015

(87) PCT Pub. No.: WO2014/202657
PCT Pub. Date: Dec. 24, 2014

(65) Prior Publication Data
US 2016/0138946 A1    May 19, 2016

(30) Foreign Application Priority Data

Jun. 19, 2013  (DE) .................. 10 2013 010 164
Sep. 9, 2013   (DE) .................. 10 2013 014 789

(51) Int. Cl.
*G01D 5/48* (2006.01)

(52) U.S. Cl.
CPC ..................... *G01D 5/48* (2013.01)

(58) Field of Classification Search
CPC ........... H01Q 21/06; H01Q 21/24; G01D 5/48
USPC ........................................... 342/361
See application file for complete search history.

(56) References Cited

U.S. PATENT DOCUMENTS

| | | | |
|---|---|---|---|
| 4,728,897 A | 3/1988 | Gunton | |
| 2003/0095257 A1 | 5/2003 | Wijntjes et al. | |
| 2003/0162566 A1* | 8/2003 | Shapira | H01Q 1/246 455/561 |
| 2006/0017638 A1* | 1/2006 | Guidon | H01Q 3/04 343/757 |
| 2007/0222582 A1 | 9/2007 | Fontijn | |
| 2010/0118398 A1 | 5/2010 | Grau | |
| 2012/0120390 A1 | 5/2012 | Fattal et al. | |
| 2014/0036265 A1 | 2/2014 | Tsujita et al. | |

FOREIGN PATENT DOCUMENTS

| | | |
|---|---|---|
| CA | 2193754 C | 12/2002 |
| DE | 19813041 A1 | 10/1999 |
| DE | 10142449 A1 | 3/2002 |
| DE | 10132685 A1 | 1/2003 |
| DE | 102007045181 A1 | 4/2009 |
| DE | 102008019621 A1 | 9/2009 |
| DE | 102005031966 B4 | 10/2011 |
| DE | 102011078418 A1 | 1/2013 |
| EP | 1507137 B1 | 2/2012 |
| EP | 2597430 A1 | 5/2013 |
| GB | 618615 A | 2/1949 |
| GB | 1493988 A | 12/1977 |

(Continued)

*Primary Examiner* — Harry K Liu
(74) *Attorney, Agent, or Firm* — Rankin, Hill & Clark LLP

(57) ABSTRACT

The present invention relates to systems for changing and measuring the polarisation of radio waves. Embodiments of the systems are disclosed for different applications as well as uses of the systems as sensors for measuring angles and shifts.

12 Claims, 7 Drawing Sheets

(56) References Cited

FOREIGN PATENT DOCUMENTS

| | | | | |
|---|---|---|---|---|
| KR | 101172437 B1 * | 8/2012 | .............. | H01P 1/161 |
| WO | 2009/055728 A1 | 4/2009 | | |
| WO | 2012/143988 A1 | 10/2012 | | |

* cited by examiner

Fig. 3)
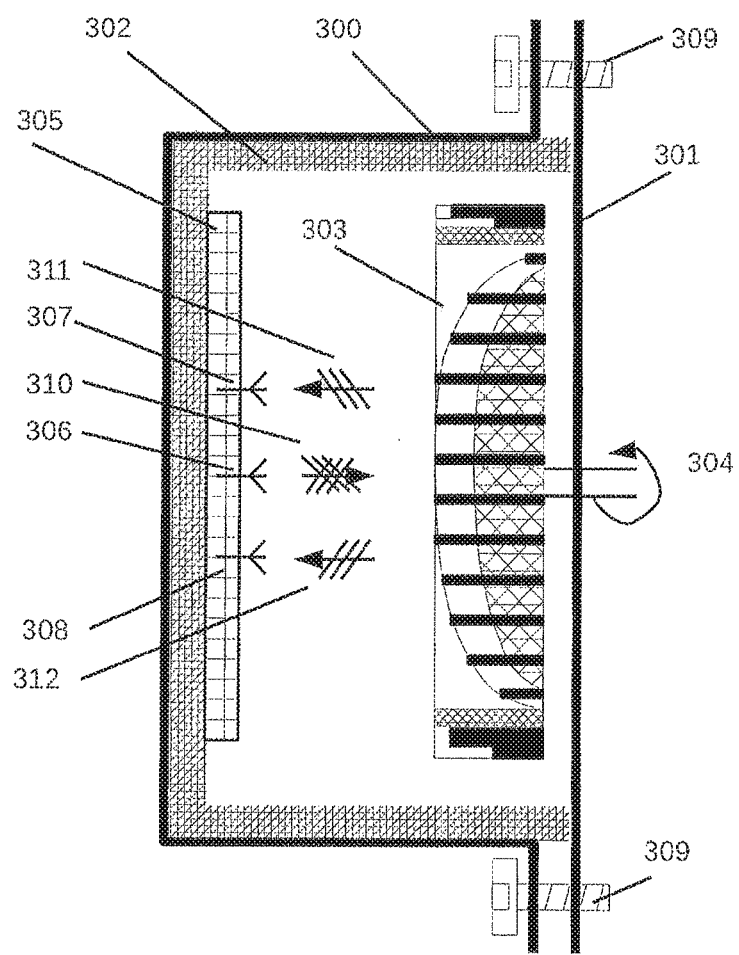

DEVICE FOR MEASURING A ROTATIONAL ANGLE BY MODIFYING AND MEASURING THE POLARIZATION OF RADIO WAVES AND USE OF SAID DEVICE

FIELD OF THE INVENTION

The present invention relates to devices for changing and measuring the polarisation of radio waves as well as their application for measuring angles of rotation and shifts.

BACKGROUND

The present invention relates to a device for changing and measuring the polarisation of radio waves and to a sensor which measures mechanical angles of rotation or shifts via the polarisation of radio waves. It shall be possible to take measurements quickly and without great latency (in real time), in order to allow the device to be used in control loops for fast-moving objects such as in servos.

Using a suitable sensor a mechanical angle of rotation can be measured by measuring polarised light (DE 10 2005 031 966 B4). An angle sensor of this kind has a number of positive properties, which distinguishes it from other angle sensors. The most obvious property is the translation invariance between sensor and signal transmitter. This on the one hand, leads to distinct simplifications during adjustment and calibration and on the other, to insensitivity in relation to mechanical vibrations.

In certain situations angle measuring with polarised light, despite its robustness, still suffers from some disadvantages. One disadvantage is the use of optical materials as transducers. Some of them are brittle (glass) or scratch-sensitive (plastic foils). On the sensor side it is difficult to integrate transmitters and receivers of light, since both are typically manufactured from different materials, although some progress has already been made (e.g. OLED on chip). Besides the lifespan of LEDs is limited, especially for high temperatures or a corrosive environment. Finally the use of light requires transparent and more or less clean surfaces, which on the one hand restricts, what materials can be used, and on the other, in extremely rough conditions, makes operation of the sensor difficult.

It would therefore be nice if the advantages of polarisation measuring could be upheld, whilst eliminating the problems connected with optics, and if the temperature range, which is limited due to the LEDs and optical polarising filters, could be widened.

Polarisation is an important property of all electromagnetic waves, from radio frequencies to optical frequencies and beyond. In the field of optics polarisation is used in the most varied situations, such as for the suppression of reflections or the visualisation of mechanical stresses. Surface characteristics too can be examined with the aid of a polarisation sensor (EP 1 507 137 B1). Polarisation of light is also used for modulating optical signals in communications technology (CA 2 193 754C).

In the area of radio waves (referring to radio frequencies in the widest sense) polarisation is used sometimes in order to increase the data rate of a communication channel because orthogonally polarised waves do not interfere with each other (GB 618 615 A). Conversely the mostly polarised energy emitted by antennas can lead to undesirable effects, for which, for example, bad reception is an indication in the case of a badly aligned radio antenna.

DE 10 2011 078 418 A1 describes an ellipsometric analysis of surfaces by means of millimeter waves which is also based on the evaluation of a change in polarisation. This relates to the determination of roughness, layer thicknesses and other parameters.

When changing over from the wavelengths of light to distinctly slower radio waves, the materials for these waves change considerably. There is also a marked change in the components for transmitter and receivers and in the properties of transmitters and receivers. As such an antenna for radio waves has nothing in common with an LED or a photodiode. As regards the materials, the considerably longer wavelengths of radio waves lead to the effect that dirt is much less influential which for a large part, is due to the relationship between wavelength and object size, but also to the properties of the dirt. Whilst metal and sand have comparable properties for optical frequencies, the effect upon longer radio waves is completely different.

In radar technology too, polarisation is used in some cases, for example in order to measure the position of an object such as a hidden pipeline (U.S. Pat. No. 4,728,897). Here use is made of the fact that a weak echo of a hidden elongated object can be distinguished from highly undesirable echoes if one repeats a radar measurement with different polarised transmit signals and forms correlations. However, radar technology as a rule relates to measuring distances and speeds, e.g. measuring the runtime or the Doppler Effect. Polarisation in this context is rather disruptive since it can aggravate the detectability of certain objects because the radar echo of an object can change with its alignment with respect to the radar unit.

Radar is typically applied to the detection of an unknown object/an object not belonging to the radar unit. This may be a hidden pipe, another ship or an aeroplane, a car or a human being.

The radar frequencies used depend on the respective application because e.g. achievable ranges and resolutions change depending on the frequency and because the object which is expected to be detected (car or human being) has to be reliably detected. Here, very high frequencies could, for a long time, only be generated by means of special tubes, later via expensive special semiconductors, but latterly also in silicon. Apart from the extraordinary advances in microelectronics which make it possible to use conventional switching technology as far as into the lower THz range, there are very skilful approaches to operate semiconductors in the way tubes used to be operated, such as by stimulating plasma vibrations (Öjefors, Pfeiffer, "A 0.65 THz Focal-Plane Array in a Quarter-Micron CMOS Process Technology", IEEE JSSC Vol. 44, No. 7, July 2009). Such approaches permit the generation and detection of radio waves in the THz range with comparably small and low-cost systems and, in the ideal case, can be monolithically integrated.

The determination of angles, for classic radar units, means an angle in space to an object, which is determined either via a rotating antenna array or via triangulation (DE 10 2008 019 621 A1). An angle of rotation in relation to a previously determined object can, in certain cases, be determined by approximation via the comparison of echoes of varying size with different polarisation. This presumes that the object to be measured is anisotropic even for the radar frequency/wavelength. That means that the object to be measured has to have anisotropic structures, which bear a certain relation to the wavelength used. A pronounced anisotropy results if the structures are smaller than the wavelength, but not so small as to prevent an interaction. The situation is aggravated in that, as a rule, the object to be measured has a random 3D alignment in relation to the radar unit thereby making an accurate measurement of angles of rotation impossible. In the case of looking for a pipe, angle measurement can under certain circumstances be carried out relatively accurately if the radar unit is held in parallel to the pipe. In this case the radar unit is moved during measuring and possibly rotated until an accurate localisation and orientation is found, whilst the object is stationary.

It is not a matter of course that the radar unit can measure the spatial orientation of an object. For very extensive objects and high-resolution radar units an image of the object, and therefrom its orientation, can be ascertained. For a stationary unit this is normally not successful. In this case polarisation may be helpful in certain circumstances:

For a 10 GHz radar which operates at wavelengths of 30 cm, a grid consisting of 1 cm thick rods and a few 10 cm long rods is a good polariser which allows the conclusion that the grid is rotated transversely to the radar beam. The wing of an aircraft on the other hand, would not generate such pronounced polarisation information because a large part of the reflection comes from its massive surface. Conversely an extremely fine optical polarising filter does not affect this radar radiation because the tiny, partly molecular structures show hardly any interaction with this frequency. The fact that a wing or a pipe generates strong and partially polarised echoes as a function of the polarisation of the incident rays, is due to effects, which are similar to those of the reflection of light on glass (see Brewster angle for complete polarisation of reflected waves) as well as to lens-type effects through surface-induced currents, wherein the surface structures, in conjunction with the direction of the current flow (polarisation direction), have an influence on the "lens characteristic" of the object. Such structures therefore, due to the macroscopic shape and structure of their surface, comprise polarisation-dependent characteristics, which vary however, depending on the irradiated location and the angle of incidence of the radio waves. Therefore accurate angle measurements on such structures with the aid of polarisation are possible only with the help of reference measurements and an accurately adjusted position between radar and object.

Apart from the structure size of polarisation-changing structures account has to be taken, with radar measurements, of the minimum distance to the object to be detected. If the distance is too small, the transmit signal and the receive signal can hardly be distinguished from one another. Further there are near-range effects which can be called proximity effects and which are due, less to wave propagation than to the existence of quasi-static fields. For example, a reflector which is too close to the antenna, may have an effect which is more akin to a capacitive electrode. Echo signals in the widest sense are determined both through capacitive and inductive couplings with the reflector and through runtime and waves, but also through resonance effects and the tuning quality of the badly defined resonator (both radar and reflector reflect a part of the signal, the distance between both of them determines the possible resonance frequencies. Stationary waves can falsify to a large extent the desired signal, in particular because stimulation close to the resonance frequency leads to big phase shifts). A transducer should therefore preferably not lie in the near-field of the antennas.

The measuring of angles of rotation of, say, an antenna mast with quasi-static signals is described e.g. in GB 1 493 988 A, where two phase-shifted transmit signals are generated, and by mixing them with the receive signal, a mixed signal is generated which comprises two frequency-shifted components depending on the rotational frequency, and the electrical phase position of which, in relation to the transmit signals, is dependent on the angle of rotation of the mast. This embodiment is not suitable for determining the angle of rotation of the stationary or slowly rotating unit, because here the two frequency components merge with one another.

The DE 198 130 41 A1 describes a device for measuring rotating objects, which is based on the Doppler Effect and which measures a spectrum of the echo and compares it with a reference spectrum, in order to detect the wear of a tool and other error conditions. This achievedhod is however, sensitive to vibrations and not suitable for ascertaining the angle of rotation of a stationary object.

The DE 101 42 449 A1/DE 101 32 685 A1 describes a method for determining an angle of rotation or a distance, which is based on measuring the signal phase (of a delay). Again, with this achievedhod evaluation of the signals is aggravated due to vibrations because a change in position of the transducer leads to a change of the signal phase, which is not easy to distinguish from a rotation of the object.

DISCLOSURE OF THE INVENTION

It is an object of the invention to ensure an angle measurement which is insensitive to adjustments and vibrations.

Further, it shall be possible to perform measurements quickly and without great latency (in real time), so that it can also be used in control loops with fast moving objects, where predominantly optical and magnetic processes are used.

According to a first teaching of the present invention the previously derived and outlined object is achieved by a device for changing and measuring the polarisation of radio waves, with at least one transmitter (100) of radio waves (102), i.e. a transmitter with antenna (101) configured (arranged) for transmitting radio waves, with at least two receivers (106) for radio waves, i.e. receivers with antennas (104, 105) configured (arranged) for receiving radio waves, with an anisotropic transducer (103) for radio waves coming from the transmitter, wherein the anisotropic transducer is rotatable about a rotary axis relative to the receivers and movable relative to the receivers, wherein the receivers are polarisation-sensitive, wherein the radio waves coming from the transmitter can be changed by the anisotropic transducer and the changed radio waves can be received by the polarisation-sensitive receivers.

According to a further teaching of the present invention the previously derived and outlined object is achieved by a method for changing and measuring the polarisation of radio waves, in particular using the device according to the invention with at least one transmitter of radio waves, i.e. a transmitter with antenna configured (arranged) for transmitting radio waves, with at least two receivers for radio waves, i.e. receivers with antennas configured (arranged) for receiving radio waves, with an anisotropic transducer for radio waves coming from the transmitter, wherein the anisotropic transducer is rotatable about a rotary axis relative to the receivers and movable relative to the receivers, wherein the receivers are polarisation-sensitive, wherein the radio waves coming from the transmitter are changed by the anisotropic transducer and the changed radio waves are received by the polarisation-sensitive receivers.

As described above the polarisation dependency generated by macroscopic structures is no good for a position-independent and adjustment-free measuring of the polarisation angle of the received radio waves. A spatially extended polarisation filter on the other hand, is characterised in that, irrespective of the location, it comprises the same polarisation properties, and is anisotropic. Being anisotropic means that for the radio waves used it appears to be macroscopically unstructured, but comprises direction-independent properties. In the optical range stretched iodised polymer films (polaroid films) are examples for anisotropic materials with polarising properties. In the range of radio waves a possible counter-piece to the polaroid films is a wire grid the grid constant of which is smaller than the wavelength used. Grid constants above this wavelength lead to diffraction effects, i.e. wavelength-dependent and angle-dependent effects are present, as are interferences (see double-gap experiment). In the near-field in a magnitude of half a wavelength undesirable location-dependent effects start to appear (see Rayleigh criterion and Abbe imaging limit).

In other words the polarisation property of an extended wire grid polarisation filter (as an exemplary realisation of the anisotropic transducer) becomes independent of the angle of incidence and the irradiated location, when its grid constant is smaller than the wavelength used, i.e. it is anisotropic, and measuring the polarisation becomes independent of the location of measuring on the transducer, as long the radio waves coming from the transmitter and received by the receiver fall through the otherwise homogenous filter or are reflected by the same, which can be ensured by sufficiently large dimensions of the wire grid.

Polarisation filters with grid constants in a magnitude of the wavelength or slightly above could still be used to a limited extent as long as the spatial resolution can be masked by a sufficiently large-area radiation. However, further undesirable effects then start to show, whilst the polarisation properties are poor, so that "true" polarisation filters with structure sizes below the wavelength are to be preferred.

Embodiments of the device and the method are the subject of the sub-claims and will now be described.

In principle one receiver is sufficient and in order to draw conclusions as to the polarisation direction of the received radio wave, either due to a variable angle between the linearly polarised transmitter and the linearly polarised receiver or with the aid of an intermediate transducer. With this embodiment, however, it is difficult to distinguish between useful signal and interference signal because a great deal of effort is required in order to ascertain a change in transmission output, a changing transmission frequency or a receiver sensitivity. In particular in the case of short-time interferences such as caused by vibrations, such measuring is unreliable. Therefore it is better to use two receivers for different polarisation directions, which eliminate a large part of error sources through relative measurement of the receive signals. Based on the 180° periodicity of the polarisation, N differently orientated receivers, in the ideal case, are set to 180°/N different angles. In other words, in order to avoid that time-related fluctuations in the signals lead to measuring errors, the signals of the receivers are measured simultaneously or at least nearly simultaneously so that when calculating the arcus tangent the absolute amplitude does not contribute to the result. Since the momentary angle of the transducer can be directly determined from each measurement of the momentary amplitudes, very high measuring rates or revs are possible.

As shown in FIG. 1a and FIG. 1b, in principle, there are two Embodiments for receiving the radio waves changed by the anisotropic transducer. In FIG. 1 that part of the radio waves (102) transmitted by the transmitter consisting of generator (100) and antenna (101) is evaluated by the receivers (106) consisting of antennas (104, 105) and amplifiers and other signal processing, which can penetrate the anisotropic transducer (103). In this transmissive case the anisotropic transducer (103) can for example of parallel metal bars. But it is also possible to manufacture it from dielectrics, preferably those with high dielectric constant for the radio waves used (e.g. aluminium oxide ceramics). As such it is possible to use dielectric bars as well as a solid material with suitable profile, e.g. parallel stamped grooves.

The term "transmitter" generally encompasses the components generator (100) and antenna (101). Correspondingly a receiver consists of antenna (104 or 105 depending on orientation), amplifier and evaluation circuit (106). Due to the low transmission outputs required it is possible to design a layout, where the antennas are a component of transmitter and receiver. As such the antenna on the transmitter side, as a frequency-selective component, may be part of the generator. In this case the generator (100) and the antenna (101) merge into one component. Analogously for a super-regenerative receiver the components antenna (104 or 105) and amplifier or evaluation circuit (106) may merge into one unit. In the extreme case the electronics for transmitter and receiver may share components. As such it is possible to re-configure the unit consisting of generator (100) with antenna (101) into a kind of super-regenerative receiver consisting of antenna (104) and amplifier (105) by way of different biasing and/or variable switching components, wherein the transmit antenna (101) and the receive antenna (104) are preferably identical. For a relative measuring of the reception strength of varying polarisation at least two such transmitters/receivers with differently aligned polarised antennas would be used, preferably four or eight.

In FIG. 1b, the transducer (103) does not need to be permeable because what is measured is a reflection deviating from the polarisation. Here an altitude profile in a solid metal block could be used for generating the anisotropy.

If the transducer is sufficiently large, a lateral translation between transducer and transmitter-receiver can be tolerated in three axes. In this way the device becomes insensitive to adjustment errors and vibration.

Despite the increased circuitry required the use of receivers for more than two different polarisation angles may be meaningful in order to improve the robustness of the signal evaluation. Especially advantageous Embodiments are those with N=4 or N=8 alignments, which are differently orientated about 180°/N.

In both FIG. 1a and FIG. 1b only one transmitter/one transmit antenna is shown. Depending upon the application it may be meaningful to feed a number of spatially shifted antenna from one transmitter, or even use a number of transmitters with a number of antennas (101) in order to achieve an increased error tolerance and to achieve a more uniform illumination of the transducer (103) with radio waves. Using the same argument a number of parallel receive antennas (104 and 105) with common or separate receivers may be meaningful. Based on the translation variance of the receive signal, the measuring results of receivers working in parallel may be combined in a very simple way.

The spatial disposition of transmitting and receive antennas may vary. It is, however, convenient to receive a receive signal at all receivers, which on average is equally strong across all angles of rotation, and which can be achieved, for example, by having a centrally arranged transmit antenna with receive antennas spaced radially apart therefrom. Analogously all receive antennas could be packed closely together with several transmit antennas forming a circle around the receive antennas. Other Embodiments including those with receive signals of systematically different strengths are also feasible because systematic errors can be compensated for during signal evaluation.

The transducer (103) does not necessarily have to polarise the radio waves completely. What is important that a part of the radio waves which is sufficient for measuring is polarised. Unpolarised or unmodified radio waves during polarisation have to eliminated/taken into account during evaluation.

The distance between the transducer (103) and the transmitting/receive antennas (104, 105) may vary as long as it is ensured that the majority of the receive signal can be associated with the echo of the transducer (103), which means that for an increasing distance and only moderate focussing of the radio waves emitted by the transmitter, the transducer (103) will be designed larger. Preferably the distance is chosen large enough so to ensure that there is no interference by the rotary encoder in the near-field of the antennas.

The configuration of the signal evaluation or it conversion to commonly used output formats is not a subject of the invention because the resulting relative amplitudes, in essence, are no different from the signals of a magnetic resolver, and after elimination of the carrier frequency are also similar to the signals from optical and magnetic sensor systems. In consequence standard components, e.g. so-called interpolators can be used for converting the measured raw data into angle sizes of different formats. As to the physics of the receive signals, reference should be made to the Malus law, which is also the basis of the optical polarisation sensor according to DE 10 2005 031 966 B4. The Malus law requires an electrical 360° period for a mechanical 180° rotation.

The use of highest frequencies is convenient with respect to possible miniaturisation, but not mandatory. Since for the application of the radar system as a protractor the dynamic range need not be extremely large (as different from distance radar) it is possible, on the one hand, to work with very low transmission outputs, on the other to use poor antennas (e.g. electrically drastically shortened antennas or antennas on high-loss substrates), so that on the one hand the frequency range which can be used for a compact construction (e.g. comparable to a conventional optical encoder) can be widened in downward direction, and on the other, low-cost materials such as FR4 can be used. This allows more freedom in the selection of manufacturing technologies and in component selection, and also a certain amount of freedom in the selection of a convenient frequency for measurements in certain media (such as in a pump). As such, depending on the distance to be bridged, one might not want to work in the medium at maximum absorption, but could certainly make use of a significant absorption in order to suppress interfering multiple reflections.

If the transducer (103) is spatially periodically structured, measuring is sensitive essentially only to the rotation of the transducer, but not to lateral positional shifts. This is a big advantage for use as a protractor. A laterally varying design of the transducer (103), however, also allows measuring lateral shifts relative to the transmitter-receivers, for which radar systems are normally insensitive because runtime and amplitude of the echo do not necessarily change during this measuring.

In this case the anisotropy of the transducer (500) changes on a macroscopic scale, for example with one period per centimeter. Whilst it is relatively difficult to manipulate the molecular orientation over a macroscopically large range as wanted, this is comparatively easy to achieve by means of mechanically processing the components for radio waves. As such the polarisation angle could be macroscopically varied along one dimension, which for a shift of the filter relative to the transmitter also leads to a change of the measured polarisation angle. This is particularly convenient if this polarisation filter structure is suitably attached to the circumference of a rotating object (503), since in this way it is possible to measure a signal which is independent of the rotary angle but instead dependent on the position in axial direction.

By using antenna switches, different antennas could be measured with a single receiver. The disadvantages in this case is the time difference during measuring, which e.g. in case of vibrations could lead to measuring errors.

In other words sequential measuring of signals of different receivers over time cancels the advantage of relative measuring, insofar as the time gap of the measurements is not very small in relation to signal changes through vibration or in relation to the movement to be measured. Simultaneous measuring of all receive signals is therefore advantageous. Analogously, in certain circumstances, in particular large distances to the transducer (103) a common antenna may be used for transmitter and receiver, which might possibly require an antenna switch. The decay time of the transmitter in this case is a limiting variable, as is the possible overriding of the receiver. All the same, such configurations are possible and meaningful in terms of the invention.

According to an embodiment of the device according to the invention for changing and measuring the polarisation of radio waves the radio waves coming from the transmitter are linearly polarised.

FIG. 2a symbolically shows the combination of a generator (200) and a dipole (201) as antenna for linearly polarised radiation (202). In this configuration it is advantageous to use receivers for two polarisation directions, which are rotated by ±45° relative to the orientation of the transmit antenna, or four receivers with ±22.5° and ±45° rotation (211-214) relative to the transmit antenna (210). For a sufficiently large surface a number of transmitters at different places can emit differently polarised radio waves, which are received by different receivers, or radio waves of different polarisation are emitted in chronological order at the same place and received by the same receivers. The N differently orientated transmit signals have a different alignment of preferably 180°/N. This additional effort can contribute to a distinctly better measuring result because the echo, for an orthogonal alignment between transmit antenna and transducer, can become very small and the quality of the measured signals depends on the angle.

According to a further embodiment of the device according to the invention for changing and measuring the polarisation of radio waves, the radio waves coming from the transmitter are unpolarised or circularly polarised, averaged over time. Generating unpolarised radiation in the radio frequency range is distinctly more difficult to realise than for light. The reason is that in the radio range the antenna is of a similar magnitude as the wavelength of the emitted radio wave, and that possibly only one antenna exists. In comparison thereto the extension of an LED is far greater than the wavelength of light and the LED emits light spontaneously from different areas of the crystal volume with uncontrolled orientation. To produce unpolarised radio waves (i.e. linearly polarised randomised over time) requires quite a bit of effort.

A simpler solution for radio waves consists in generating circularly polarised radio waves (204, 206). The helix antenna (203) shown in FIG. 2b is a possible construction, but one which is not particularly compact. FIG. 2c shows a variant, which has a distinctly flatter shape and which, in particular, can be integrated. Here a linearly polarised antenna (201) is equipped with a delay element (205). Other forms of antenna construction are possible.

Since with circular polarisation averaged over time all linear polarisation directions are covered by the transmitter, the signal reflected by the transducer over time is equally strong for all angles of rotation of the transducer resulting in more robust measurements. A certain deviation towards elliptical polarisation can be tolerated, but may require a correction of the measured values. Also, particularly in the case of circular polarisation of the transmitted radio waves, the anisotropic transducer may consist of a delay plate. In this case the receive antennas and transmit antennas may also be configured for the detection of, in particular, circular radio waves.

According to an embodiment of the device according to the invention for changing and measuring the polarisation of radio waves the device is shielded partially or wholly by a housing.

The shielding (300, 301), on the one hand, serves to fix the components of the device, and on the other, to shield it against external interferences as well as to suppress emission to the outside.

Insofar as the transducer does not represent a constructional unit with the remaining components, a closed housing in terms of shielding against radio waves may not be possible nor desirable. Nevertheless, as regards the non-rotating part, a hermetically sealed housing may be realisable, wherein this may e.g. consist of ceramics which is permeable to the radio waves used. Such a housing offers protection against dirt, corrosion and mechanical damage.

According to a further embodiment of the device according to the invention for changing and measuring the polarisation of radio waves the device contains absorbing material. In order to avoid the emission of radio waves towards the outside and to reduce measuring errors, the vicinity of the sensor, areas between the antennas as well as parts of the transducer and parts of the housing may be provided with absorbing material (302).

According to a further embodiment of the device according to the invention for changing and measuring the polarisation of radio waves the device contains absorbing structural elements.

The absorption of radio waves can be further increased through utilising geometric shapes such as honeycomb shapes or pore shapes, thereby eliminating, in places, the need for using especially absorbing materials for the structural elements (302).

According to a further embodiment of the device according to the invention for changing and measuring the polarisation of radio waves the anisotropic transducer is permeable for the radio waves transmitted by the transmitter to different degrees for different polarisations, and the polarisation-sensitive receivers receive the radio waves let through by the anisotropic transducer. Here constructions are conceivable which consist of parallel grid bars, elongated holes milled from a solid material, anisotropic structures on a printed circuit/circuit board and many more. Apart from conductive materials such as metal, dielectrics with a high dielectric constant sufficient for the used frequency are worth considering.

According to a further embodiment of the device according to the invention for changing and measuring the polarisation of radio waves, the anisotropic transducer reflects the radio waves coming from the transmitter for different polarisation to different degrees, and the polarisation-sensitive receivers receive the radio waves reflected by the anisotropic transducer. Apart from the above-mentioned permeable structures, which also reflect a part of the radio waves, non-permeable structures can be realised. Here suitable structures are, for example, patterns e.g. milled from metal, moulded or deep-drawn patterns, the relief depth of which should be adjusted to match the wavelength of the radio waves. Apart from conductive materials such as metal, dielectrics with a high dielectric constant sufficient for the used frequency are worth considering. A receive signal of varying strength could be generated by a polarisation-dependent reflection angle or a polarisation-dependent scatter angle.

According to an embodiment of the device according to the invention for changing and measuring the polarisation of radio waves the anisotropic transducer consists of a single material. The realisation of a transducer consisting of only one material, in particular of a solid piece of material, is advantageous for applications, in which the transducer is exposed to extreme stresses such as intense heat and temperature cycles, corrosion or strong vibrations.

According to a further embodiment of the device according to the invention for changing and measuring the polarisation of radio waves the anisotropic transducer consists of different materials.

A transducer consisting of different materials may be advantageous for improving certain properties. For example, a transducer which is a printed circuit, is lighter and cheaper than one made from a solid material. A combination of metal and conductive rubber as absorber for example, may also be useful to reduce annoying multiple reflections. A multi-layer embodiment of anisotropic structures forming a three-dimensional grid can also be used for improving the anisotropic properties. The use of e.g. multi-layer printed circuits is possible.

According to an embodiment of the device according to the invention for changing and measuring the polarisation of radio waves the device is assembled into a structural unit.

Here the housing (300, 301) shown in FIG. 3 can be provided, as required, with a bearing (not shown) and a shaft (304) so that the transducer (303) is always inside the closed housing. Alternatively the housing can be opened for assembly purposes and the right-hand part (301), for example, can be attached to another apparatus. This is explained in more detail in the examples.

According to an embodiment of the device according to the invention for changing and measuring the polarisation of radio waves the anisotropic transducer is structurally separated from the rest of the device.

If the device according to the invention is mounted on another device which already has a housing, the left-hand part of the housing (300) shown in FIG. 3 can be attached to the housing (301) of the other apparatus.

Applications are also feasible, where there is no direct mechanical connection between (300) and (301) or the part (301) does not exist at all. This is explained in more detail in the examples.

According to an embodiment of the device according to the invention for changing and measuring the polarisation of radio waves means are provided which are configured to give an indication, on the basis of the signals of the polarisation-sensitive receivers, as to the polarisation of the received radio waves.

The aim consists in providing a compact sensor, which prepares the raw data obtained in a suitable manner, determines the angle of the received radio waves and makes them available, ready prepared in an application-specific manner. As such a conversion of the measured angle into a differential band-limited signal is advantageous because it can be transmitted and evaluated in particular free from interferences.

According to an embodiment of the device according to the invention for changing and measuring the polarisation of radio waves means for calibration are provided.

Mechanical, constructional and electronic errors can falsify the result as much as interfering external influences. Correction and compensation of such interferences is carried out, in the ideal case, autonomously by the device, possibly following factory pre-sets.

According to an embodiment of the device according to the invention for changing and measuring the polarisation of radio waves, transmitters and receivers of radio waves are integrated. In the frequency range from approx. 50 GHz onwards wavelengths and therefore the variables of antenna structures become so small that they either become part of the package of an integrated circuit or are directly integrated with a microchip.

Apart from cost savings and further reductions in size the biggest advantage here consists in the very high precision of the relative angles between the different antennas which has a positive influence on measuring accuracy.

Further higher integration allows the use of even higher frequencies because obstructing interfaces (cables, plugs) are no longer a factor. In this context it should be stressed that there is now the possibility of working in the THz range thus making way for very small sizes of the device. The integration of transmitters and receivers on the same chip moreover, permits particularly good matching because switching parameters and temperature go through changes in equal measure for all components. Moreover as the frequency decreases, so distances drop to a point, where one leaves the near-field of antennas, which is so prone to interfering effects.

According to an embodiment of the device according to the invention for changing and measuring the polarisation of radio waves, transmitters and receivers are arranged so as to work together with means for activating an actuator and for comparing the measured polarisation of the received radio waves with a set value.

Similar to a servo application, "integrated" solutions are desirable also for drives, where drive, activation and the sensor system are combined. Given the possibility to monolithically integrate the device with silicon technology the way is then open to combine radar sensors and THz sensors with other special switching elements.

According to an embodiment of the device according to the invention for changing and measuring the polarisation of radio waves, the transmitter transmits radio waves continuously over time.

If the receivers ascertain e.g. only the direction of polarisation of the receive signal, it is sufficient, in principle, to simply measure the amplitude at which transmitters and receivers operate continuously over time and the rectified signals of the receivers are evaluated. This solution works particularly well if multiple reflections can be effectively suppressed. The complexity of the circuit and power consumption are minimal in this case. It is, of course, still possible to switch transmitter and receivers off from time to time in order to reduce power consumption.

According to an embodiment of the device according to the invention for changing and measuring the polarisation of radio waves, the transmitter transmits radio waves at intervals.

According to an embodiment of the device according to the invention for changing and measuring the polarisation of radio waves, radio waves received from the receivers are evaluated in short time intervals, which are correlated with the intervals of the transmitter.

If it is difficult to suppress multiple reflections (for example when strong mechanical vibrations occur), measuring the polarisation can take place during an interval in which only the desired useful signal is expected. Here the intermissions serve to decay the multiple reflections. In the same way the sensor can, of course, also produce intermissions for reducing power consumption.

According to an embodiment of the device according to the invention for changing and measuring the polarisation of radio waves, the radio waves emitted by the transmitter are modulated. If the transmitter transmits continuously over time, there is the possibility of stationary waves forming, which can lead to angle-dependent measuring errors. These are not stable in relation to vibrations or other mechanical changes. Also such effects are frequency-dependent. A modulation of transmitted radio waves as regards the frequency for example and an evaluation averaged over time over at least one period of a modulation signal can help to reduce such effects. Frequency modulation or other modulation may take many forms, for example the form of a ramp-shaped frequency sweep such as used normally for distance measuring with FMCW radar.

According to an embodiment of the device according to the invention for changing and measuring the polarisation of radio waves, radio weaves received from the receivers are evaluated continuously over time.

According to an embodiment of the device according to the invention for changing and measuring the polarisation of radio waves only amplitudes are evaluated by the receivers of radio waves.

For small objects regarding measuring accuracy a simple diode detector suffices as receiver. Calibration can be carried out e.g. following an AD conversion. Furthermore temperature variables and offset variables can be measured in an alternating fashion with or without a transmit signal. The transmitter is switched on and off very slowly to give the receiver time to adjust to the respective static measured value, whilst this alternating is effected quickly enough to ensure that the alignment of the anisotropic transducer during this time remains practically unchanged.

According to an embodiment of the device according to the invention for changing and measuring the polarisation of radio waves, amplitude information and time information is evaluated by the receivers of the radio waves. Apart from measuring polarisation and suppressing interference signals by means of e.g. multiple reflections, the receivers can evaluate time information also as regards e.g. the runtime of radio waves, which for example relate to the distance or the quantity of the material penetrated. Distance measuring can take place, for example, by means of runtime measuring (TOF-RADAR), by frequency modulation of the receive signal (FMCW radar) or by measuring the Doppler shift. Depending on frequency and geometric dimensions the different methods are realised with different degrees of effort. For very short distances TOF measuring (Time of Flight) is realised more by measuring the phase difference between transmit and receive signal than by measuring the absolute runtime of the receive signal. Doppler shift measuring has the problem that for a stationary transducer the resulting signal cannot be evaluated. This achievedhod is therefore not suitable here. Measuring the frequency difference between transmit and receive signal for a frequency-modulated transmit signal (FMCW or frequency jump modulation) is more suitable because even multiple echoes can be recognised unequivocally by way of the frequency difference in e.g. a FFT of the measured signal. The drawback is that the application and evaluation of this achievedhod requires considerable switching effort.

If the expected mechanical tolerance or vibration is small compared to the wavelength of the used radio waves, it may be convenient to use a constructional height changed in semi-circle or quarter-circle segments (450) by effectively a fraction of the wavelength, for recording the relative phase of the received signal compared to the phase of the transmit signal in order to ensure that using this additionally ascertained position of the segments, the measured angle is unequivocal even for a 360° interval. Measurements can be taken either central to the axis, wherein different receivers preferably measure radio waves changed by different quadrants, or shifted in relation to the rotary axis, wherein transmitters (421) and receivers (422, 423) receive radio waves changed predominantly by the same segment.

The robustness of the 360° unequivocal measurement can be further improved by evaluating them only for an inactive or almost inactive anisotropic transducer, and when in operation the same information is derived from the continuity of the measurements (i.e. more than two measurements are taken per period). Also, a plausibility check of the ongoing measuring of additional information with updated continuity data is meaningful because possible initial erroneous measurements can thereby be corrected in operation.

According to an embodiment of the device according to the invention for changing and measuring the polarisation of radio waves the anisotropic transducer comprises a structural asymmetry, receivers of radio waves are suitable for measuring structural asymmetry, unequivocal measuring is effected over the relative angle of rotation of the anisotropic transducer at a 360° interval from the combination of all measured signals of the device.

If the anisotropic transducer (303) is e.g. inclined relative to its rotary axis (304) or has other features such as a varying thickness, the receivers of radio waves, apart from polarisation information, can gain distance information which permits an unequivocal assignment of the angle of rotation at a 360° interval. Extending the unequivocal measuring range from 180° to 360° is important to many applications.

According to an embodiment of the device according to the invention for changing and measuring the polarisation of radio waves the anisotropic transducer comprises a structural asymmetry, at least one further sensory component for measuring the structural asymmetry is present, unequivocal measuring is effected via the relative angle of rotation of the anisotropic transducer at a 360° interval from the combination of all measured signals of the device.

In order to keep the complexity of the receivers small it may, in certain circumstances, be useful to gain the required additional information for the 360° interval from a separate measurement. In principle any type of sensor can be used for this. Equally the structural asymmetry can be produced in many ways. Preferably very robust measuring processes are used in order not to impair the otherwise strong robustness of the device according to the invention. Apart from polarisation measuring of radio waves capacitive and inductive methods are conceivable which can be used in different ways.

FIG. 4a shows an exemplary realisation of the transducer for measuring in a top view. In the centre the anisotropic part (400) can be seen. This may be separated from the other structural elements by a shielding or absorption area (401). On the outside, in order to realise the structural asymmetry on e.g. different radii, there are traces with binary code elements (402/403 and 404/405), which have e.g. different heights for use with an inductive or capacitive sensor (430) or which can have a polarisation effect which varies (with regard to measuring using further devices according to the invention).

In order to obtain especially robust results from measuring this information, it makes sense to take differential measurements in places which lie opposite each other. Using two traces instead of one ensures especially robust results at the transitions. These traces should be of a sufficient width in order to maintain insensitivity to adjustments and vibrations. It is unimportant, at which point this additional information is measured, the embodiment shown in FIG. 4a is merely an example.

In suitable places mechanisms may be provided for mechanically fixing the transducer to a shaft or similar (410). Or the transducer may be hollow, as shown by way of example in FIG. 4c and FIG. 5b.

According to an embodiment of the device according to the invention for changing and measuring the polarisation of radio waves, the anisotropic transducer is formed in such a way that the multiple reflections of the radio waves coming from the transmitter are attenuated when received by the receiver.

The use of radio waves in a very small space means that multiple reflections have a much stronger influence on the result of the measurements. This represents a problem in particular with respect to insensitivity to vibration. Since the bunching of the radiation becomes weaker with each reflection, effective arching of the anisotropic structure (400) of the transducer may be used for strengthening the deflection of the multi-reflected radio waves (427) towards the outside, where they can be destroyed by absorbing elements. An exemplary realisation is shown in FIG. 4b, a side view of the anisotropic transducer shown in FIG. 4a.

The previously derived and outlined object is achieved, according to a second teaching of the present invention, by a device for changing and measuring the polarisation of radio waves, with a configurable transmitter-receiver (600) for polarised radio waves (603), an antenna (601) for polarised radio waves, a transmit amplifier (600), a receive amplifier (600) and an anisotropic transducer (602) for the transmitted radio waves, wherein the anisotropic transducer can be rotated about a rotary axis relative to the transmitter-receiver or can be shifted relative to the transmitter-receiver, wherein transmit and receive amplifiers share switching components, wherein the radio waves transmitted by the transmitter-receiver can be changed by the anisotropic transducer (602) and the changed radio waves can be received by the same antenna (601).

The previously derived and outlined object is achieved according to a further teaching of the present invention by a method for changing and measuring the polarisation of radio waves, in particular using a device according to the invention with a configurable transmitter-receiver (600) for polarised radio waves, an antenna (601) for polarised radio waves, a transmit amplifier (600), a receive amplifier (600) and an anisotropic transducer (602) for the transmitted radio waves, wherein the anisotropic transducer can be rotated about a rotary axis relative to the transmitter-receiver or can be shifted relative to the transmitter-receiver, wherein transmit and receive amplifiers share switching components, wherein the radio waves transmitted by the transmitter-receiver can be changed by the anisotropic transducer (602) and the changed radio waves can be received by the same antenna (601).

Embodiments of the device and the method are the subject of the sub-claims and will now be described.

According to an embodiment of the device according to the invention for changing and measuring the polarisation of radio waves, the device comprises at least two configurable transmitter-receivers for polarised radio waves with respectively at least one antenna (601) for differently polarised radio waves with, in other respects, identical characteristics as in the preceding paragraph.

The previously derived and outlined object is achieved according to the third teaching of the present invention by a device, characterised in that parts of its surface form an anisotropic transducer such that incident radio waves thereon are changed in their polarisation such that their angle of rotation, their revolutions or their shift is measurable by means of a device according to the invention.

In this case the transducer in addition assumes other functions in the apparatus to be measured. In some cases, for example during manufacture of a turbine shaft or camshaft, the anisotropic structure required at the end of or on the circumference of the shaft can be produced during its manufacture so that apart from cost savings, there is no longer any need for a later assembly and adjustment. The main function of the component in this case is a mechanical function. As a result of suitable shaping or structuring the mechanical component of the apparatus to be measured gains a further function as transducer.

Embodiments of the device are the subject of the sub-claims and will now be described below.

An advantageous usage of the device according to the invention for changing and measuring the polarisation of radio waves is the measuring of a mechanical angle of rotation or a rotary speed.

For an especially compact embodiment the anisotropic transducer (303) is mounted to the end of a shaft. The device according to the invention is thus able to measure the absolute angle of the shaft, its existing rotary speed if applicable and its direction of rotation.

An advantageous usage of the device according to the invention for changing and measuring the polarisation of radio waves is measuring the shift. If the anisotropic transducer has a laterally varying polarisation, the device can be used to measure a shift of the transducer relative to the other components of the device. Here the shift for a consistent distance is of particular interest. A normal RADAR is insensitive to such shifts because of two things: the target (the anisotropic transducer) does not have a suitable structure, and the radar is not designed for an accurate analysis of the polarisation.

A further advantageous usage of the device according to one of the preceding claims is measuring an angle of rotation, a rotary speed or a shift with several laterally distributed devices in different places on a commonly used transducer.

In this way, due to the translation invariance in polarisation-measuring, a particularly low failure probability can be ensured because a correct angle can be measured e.g. with the aid of media filtering, even if the anisotropic transducer (400) is partly destroyed or parts of it are covered, or if individual sensor units (430) or (470) fail. The sensor unit (430 or 470) is then made up of the remaining components of the device according to the invention with the exception of the anisotropic rotary encoder, i.e. transmitter, receiver, antennas and, if required, housing.

A further advantageous usage of the device according to one of the preceding claims is measuring an angle of rotation, a rotary speed or a shift at the circumference of a structure, wherein the circumference of the structure comprises the characteristics of the anisotropic transducer according to at least one of the claims of the invention.

The above mentioned features can be combined at random with each other. Furthermore all mentioned embodiments are to be understood as examples. Deviating realisations are possible in terms of meaning and scope of the present invention.

Detailed descriptions of the applications are found in the examples described.

SHORT DESCRIPTION OF THE DRAWINGS

The invention will now be described in detail by way of exemplary embodiments with reference to the attached drawings, in which FIG. 1a shows an embodiment according to the invention of transmitters and receivers for radio waves and anisotropic transducer in a transmissive embodiment FIG. 1b shows an embodiment according to the invention of transmitters and receivers for radio waves and anisotropic transducer in a reflective embodiment FIG. 1c shows an exemplary orientation according to the invention of linearly polarised transmit and receive antennas FIG. 2a shows a transmitter with antenna for linearly polarising radio waves FIG. 2b shows a transmitter with antenna for circularly polarising radio waves (helix)

FIG. 2c shows a transmitter with antenna for circularly polarising radio waves (linearly polarising antenna with downstream delay element)

FIG. 2d shows an exemplary orientation of linearly polarised antennas for on-average-unpolarised, transmitted radio waves FIG. 3 shows an exemplary device according to the invention with housing and dampening materials FIG. 4a shows an exemplary embodiment of the anisotropic transducer with structural asymmetry for the unequivocal measuring of angles at a 360° interval, top view. Structural asymmetry type 1 due to semi-circle segments (402-405), type 2 due to transducer segments of varying thickness, indicated by (450)

FIG. 4b shows an exemplary embodiment of the anisotropic transducer for reducing multiple reflections of suitable shaping. Side view with structural asymmetry type 1 (402-405) and additional sensors (430), filter (401), (450) is arched for reducing multiple reflections FIG. 4c shows an exemplary embodiment of the usage of the device according to the invention at several locations on a shared transducer, topview FIG. 5a shows an exemplary embodiment of the anisotropic transducer for measuring axial shifts or for measuring angles of rotation or shifts on the circumference of a shaft (layout)

FIG. 5b shows an exemplary embodiment of the usage of the device according to the invention for measuring an angle of rotation at the circumference of a structure FIG. 5c shows a double/double-sided structuring of the anisotropic transducer in orthogonal directions for measuring biaxial shifts or for measuring axial shifts and angles of rotation in combination at the circumference of a shaft (layout)

DESCRIPTION OF SPECIFIC EXEMPLARY EMBODIMENTS/APPLICATIONS OF THE INVENTION

It is an object of the invention to propose an angle measuring method which is insensitive to adjustment and vibration. The invention permits working with robust materials such as stainless steel and ceramics, is insensitive to temperature and dirt and achieves accurate measurements on both stationary and rotating objects. The measuring process is performed quickly without great latency and can therefore be used in control loops for fast moving objects. A further object of the invention consists in measuring shifts.

Example 1

Measuring the Angle of Rotation on a Camshaft

For many years combustion engines of cars for example have been started by a starter motor although knowledge of the actual angle of rotation of the crankshaft would permit direct ignition of the currently correctly positioned cylinder. This is due to the fact that at the current time there are no sufficiently accurate and robust angle sensors on the market which would stand up long-term to the operational conditions on the camshaft.

It is not until recently that incremental magnetic geartooth sensors have made it into the series production of motor vehicles. Their drawback however consists in that they only operate incrementally, i.e. do not know the absolute angle position once they are in operation. Therefore following their first start, the starter motor is required in order to find an index mark during the first revolution. As long as the sensor remains in operation, the combustion engine can be stopped at traffic lights and quickly started again without the help of the starter motor.

Admittedly this is a distinct advancement because it helps reducing the consumption of petrol. The solution seems inelegant however, because the heavy and expensive starter motor is still required due to the inadequacy of the angle sensor on the camshaft.

Figure 1A:
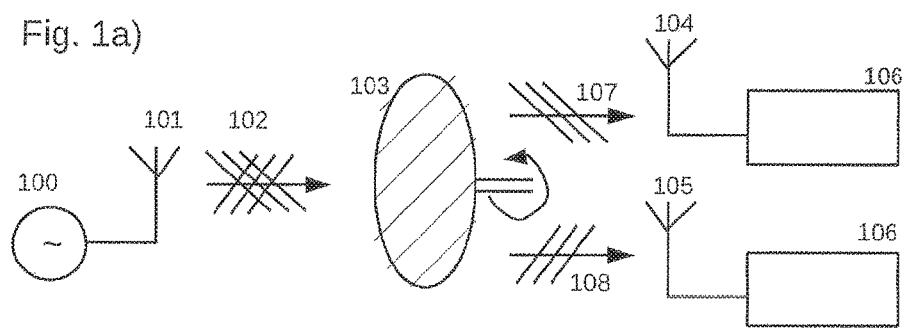
Figure 1B:
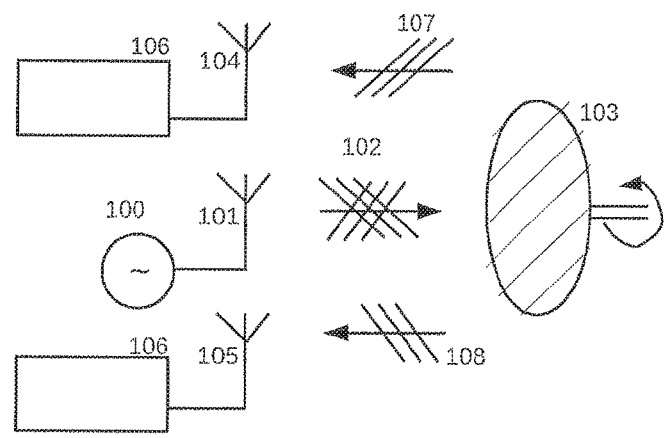
Figure 1C:
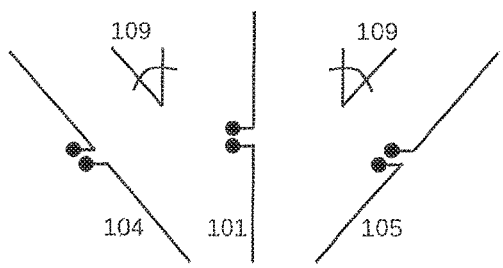
Figure 2A:
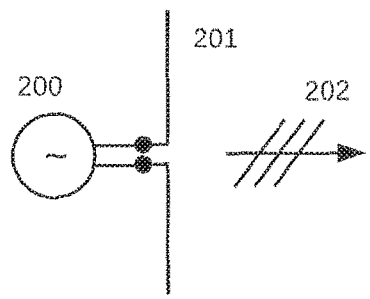
Figure 2B:
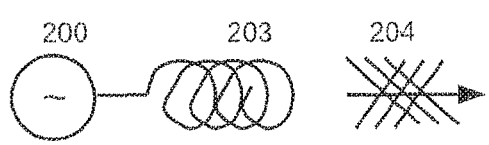
Figure 2C:
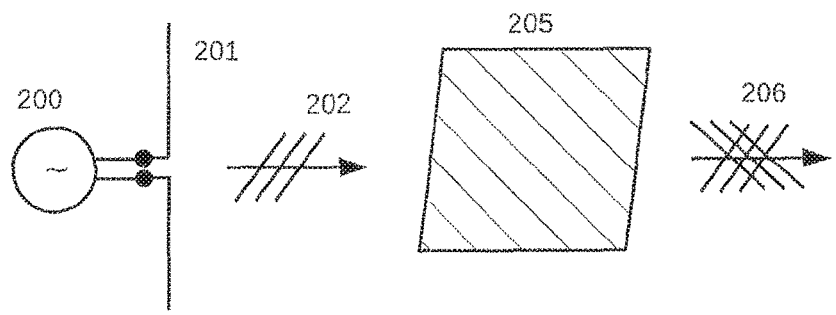
Figure 2D:
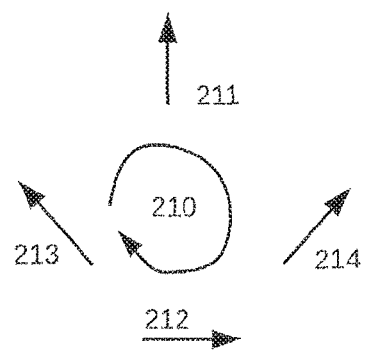
Figure 4A:
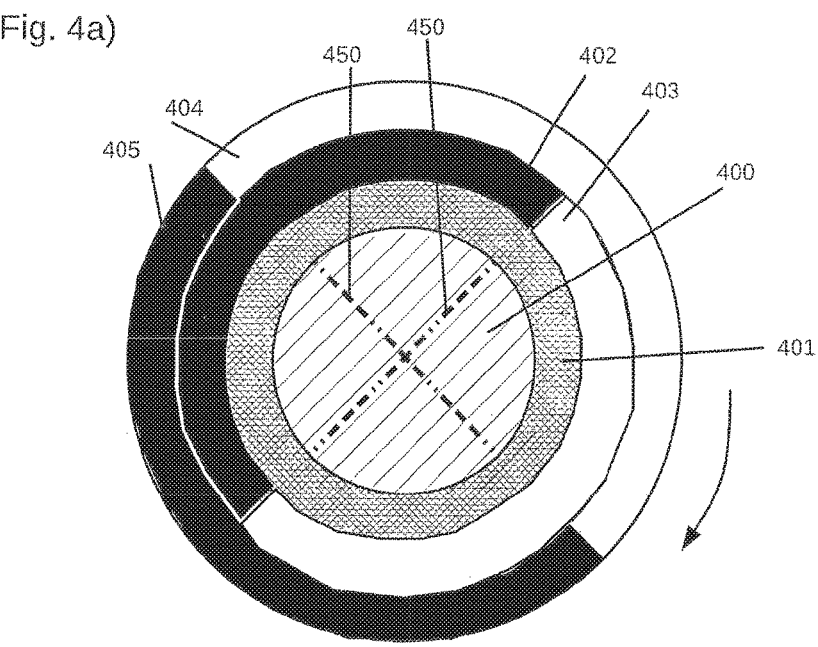
Figure 4B:
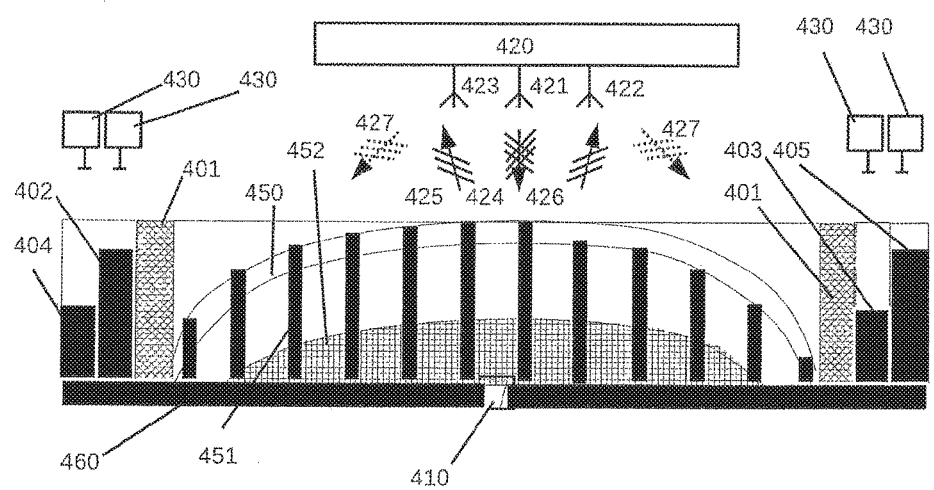

The sensor according to the invention may for example be equipped with a transducer similar to FIG. 4a and FIG. 4b, which may consist of a solid metal block and is thus insensitive against temperature and dirt. The other sensor components may be housed in a hermetically sealed housing (e.g. ceramics) and are mechanically decoupled from the engine block by the housing (similar to FIG. 3), in particular the thermal stresses are less. Due to angle measuring being carried out by means of polarisation of radio waves, vibrations, thermal expansion, dirt etc. are tolerable. The sensor is able to transfer the ascertained signal with high accuracy and resolution in an electrically robust manner to the engine electronics, where the ignition signals are generated.

Example 2

Measurement of the Conditions of Components on Heavy Construction Machinery Similar to the problem in example 1 difficulties also exist with respect to the control of hydraulically or pneumatically operated elements of heavy machinery. In the absence of robust rotary encoders, intensive work is currently being carried out on a. o. robust odometers for measuring the deflection of a hydraulic piston. Here too measuring accuracy is impaired, on the one hand, by multipath scattering of radar waves along an oil-filled cylinder and on the other hand, by strong damping in the oil. Measuring the joint angle by means of polarisation is again a more robust solution, wherein an outer housing consisting e.g. of stainless steel and an inner housing wall consisting of ceramics can protect the sensor against any environmental influences.

Figure 4C:
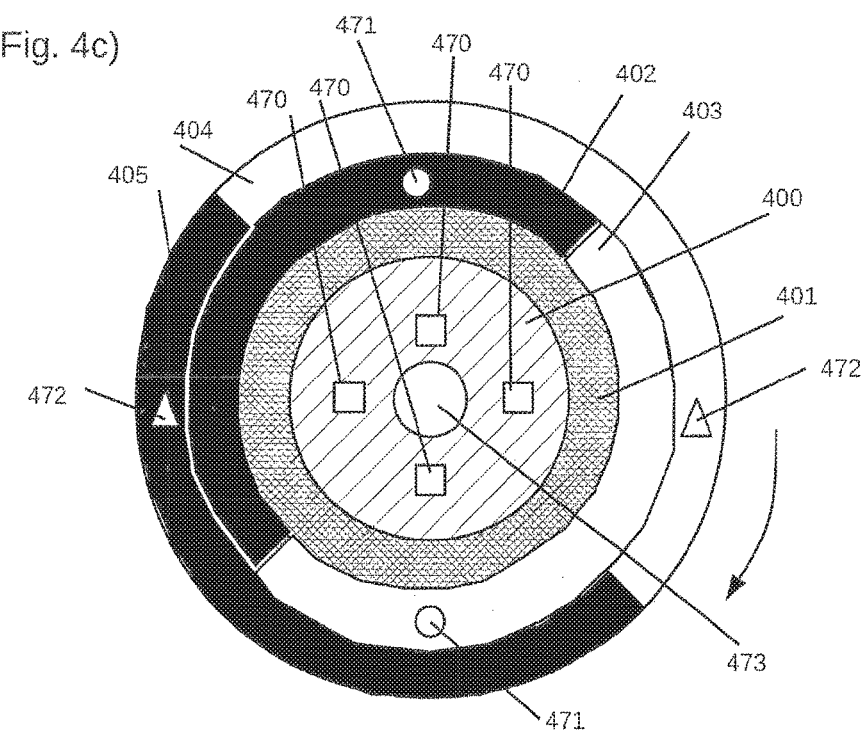

Apart from the said hydraulically operated articulated joints turret constructions of cranes and diggers are another field of application. Here the top of the base may e.g. be equipped with a relatively large-area transducer, whilst at different places of the rotatable superstructure devices according to the invention measure the angle of rotation of the superstructure (or vice versa). This embodiment corresponds to FIG. 4c and at the same time is an example, where there is no constructional unit between transmitter and receiver on the one hand, and the transducer on the other, and therefore no closed housing.

Example 3

Monitoring of Pumps and Flow Rate Measuring

For a suitable frequency, radio waves are good at penetrating liquids. For polarisation measuring with the device according to the invention it is unimportant in this case, whether the liquid or a surrounding pipe is transparent or whether the liquid has larger particles suspended in it. A rotatably mounted fan wheel or the shaft of a pump may be equipped with the transducer according to the invention, wherein here again the variant consisting of a monolithic material block such as stainless steel is to be preferred in order to avoid ageing and corrosion. The remaining part of the device may be outside the liquid and may transmit the radio waves through a plastic pipe. Alternatively a ceramic window may be provided if the pipe is not transparent for the radio waves.

Example 4

Measurement on Solid Shafts and Translation Measurement

In the field of power engineering for example, there exists the problem that the angle of rotation must be measured at the circumference of a very solid shaft, the circumference of which may exceed one metre. Optical methods have so far been useless in this case, and magnetic sensors can only be used with a considerable amount of effort and even then can usually supply only incremental information. One problem when mounting transducers on the circumference of a very large structure is thermal expansion, which varies in intensity for different materials or which can cause the transducer structure to become detached from the shaft (503).

The advantage of the device according to the invention consists in that the transducer (500, 502, 504, 505) can be manufactured from different materials, which could include the same material as that from which the shaft (503) is manufactured. A metal sheet (500) placed around the shaft and fixed to it, which due to rolling or deep-drawing may have acquired an anisotropic structure describing e.g. a sinusoidal shape when rotating around the shaft, can be used for measuring the angle of rotation for a sideways view of the sensor unit (501) upon the shaft. In this case the rotation of the shaft is converted into a locally varying orientation of the anisotropic structure on the transducer, which for a sufficiently large shaft diameter is easy to implement.

A further interesting aspect of this embodiment is that the periodicity of the anisotropic structure does not necessarily have to be one period per revolution. In order to increase the resolution and accuracy adjacent traces with differently numbered periods per revolution may also be feasible (504).

Figure 5A:
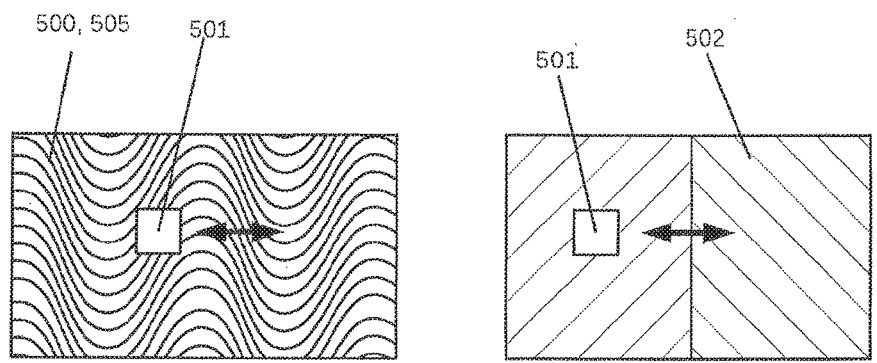
Figure 5B:
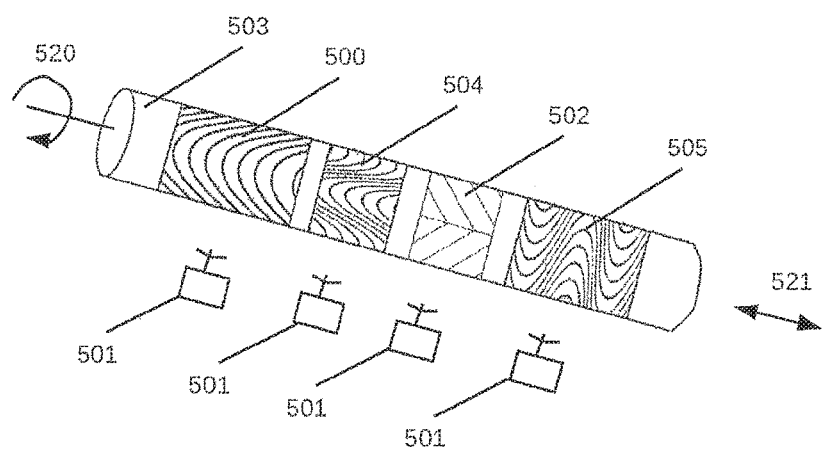
Figure 5C:
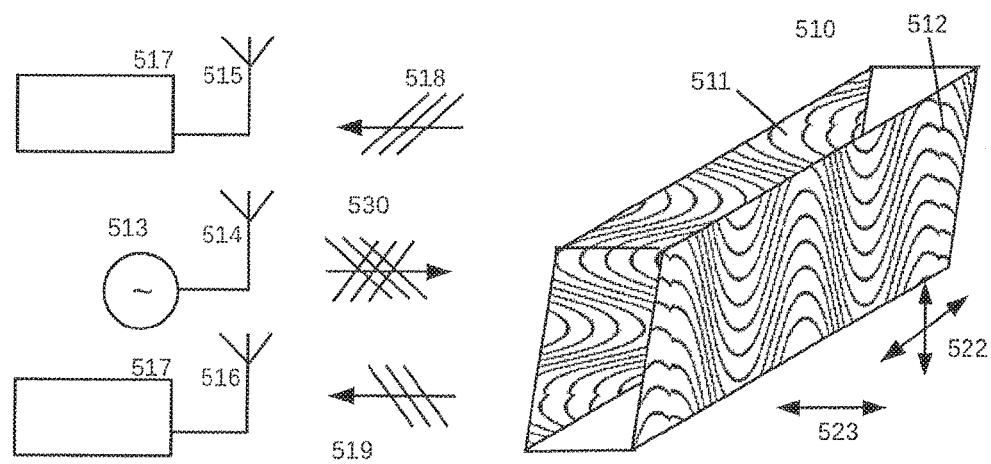

When using an orthogonally orientated anisotropic transducer (505) it is also possible to measure a linear shift of the shaft (503) along the axis, independently of its angle of rotation. This is easy to understand when looking at the layout of the transducer (500) in FIG. 5a. In the layout a shift with respect to the sensor unit (501) in one spatial direction is without effect, whilst in the spatial direction orthogonal thereto a shift causes a change in the measured polarisation direction.

By combining several anisotropic transducers (500, 502, 504, 505) in different orientations and by using several devices for transmitting and receiving radio waves (501) the transient angle of rotation and the axial shift of a shaft (503) can be measured in, for example, a gearbox.

If the anisotropic transducer (510) is structured in an orthogonal manner on both sides, either a shift can be measured in different spatial directions from both sides, or the differently delayed echoes of both sides are measured on one side of the anisotropic transducer (510) for a resolution over time of the measured signals. This permits measuring also of two-dimensional shifts or measuring rotation and shift of the shaft in combination in case of an encased shaft (503).

Example 4

Exemplary Embodiment of a Combined Transmitter-Receiver

Figure 6A:
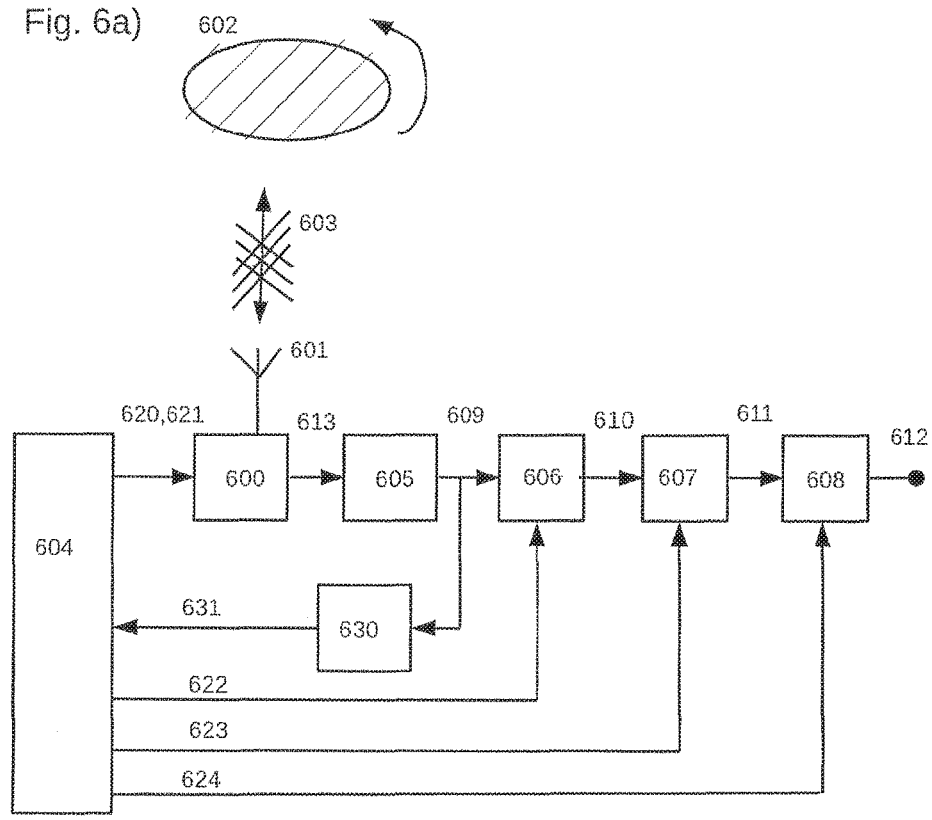
FIG. 6a shows an exemplary embodiment of a polarisation-sensitive transmitter-receiver with two alternative evaluation processes: a) super-regenerative pulse operation (without (630, 631)) and b) amplitude-regulated operation (with (630, 631))
Figure 6B:
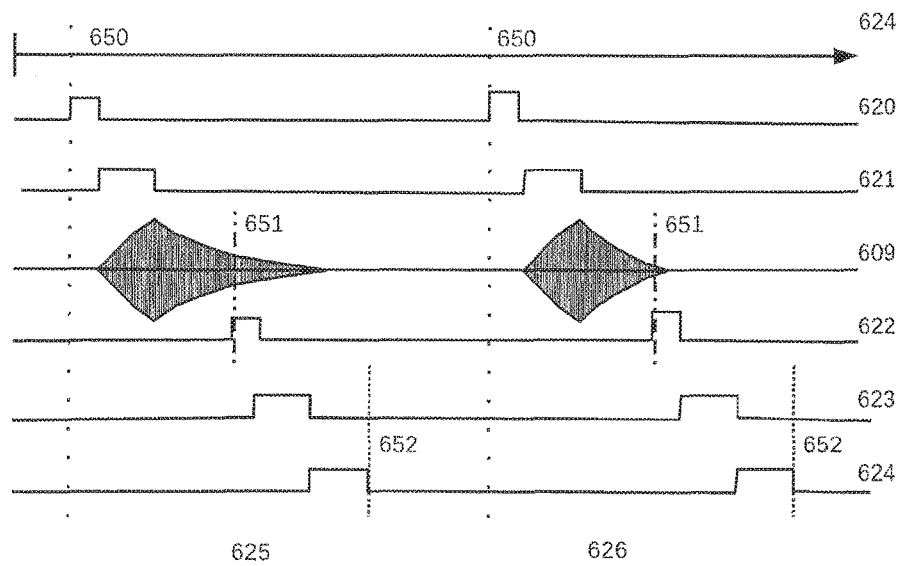
FIG. 6b shows an exemplary time progression of the control and measuring signals of the embodiment shown in FIG. 6a for parallel orientation (left) and for orthogonal orientation (right) between antenna and transducer.

The measuring problems described require only very low transmission outputs on the one hand, whilst on the other, the required dynamic range of the receive signals is comparatively small because the distances between the components of the device change only very slightly. This can be utilised for simplifying the switching components. In the high-frequency range an LC oscillator can be combined with a linearly-polarised dipole antenna because in order to realise inductivity only a short line segment is required. To make the oscillator oscillate requires more energy than it consumes/emits. This can be ensured by a sufficiently strong bias signal/a sufficiently high amplification factor. In FIG. 6a the signal of the coil/antenna (601) emitted by the oscillator (600) is reflected at varying strengths by the anisotropic transducer (602), which on the one hand causes the amplitude of the oscillator signal to change and on the other, following reduction of the bias current/switch-over of the component (600) into an amplifier, causes irregular signal decay.

With a first switching variant after a certain time of changing over into receive mode, the decayed amplitude (613), after amplification in (605), can be measured on (609) and processed, using e.g. the track-and-hold (606), the analogue-digital converter (607) and the evaluation unit (608), which are controlled by control signals (620) to (624) from the control unit (604) and produce the final result (612). In this case, on the one hand critical timings must be maintained and on the other, the measured signal is approximately exponentially non-linear over time.

With an alternative switching variant the oscillator (600) is operated permanently and the signal (609) amplified by (605) is compared in a comparator circuit (630) with a pre-set amplitude threshold. The result is forwarded to the control unit (604) for checking gain or bias of the oscillator (600). The result is then indirectly available in form of a control variable (621), since the quality of the oscillator is dependent on the angle of rotation of the anisotropic transducer (602) and the required output of the oscillator (600) is dependent on the quality of the transducer. This dependency is approximately square and therefore makes signal processing easier. Moreover there is no need for time-critical control of the different signals in this case, control can be effected at a low band width. The output of measurements can in principle take place continuously over time.

Relative measuring for determining the angle may be effected by comparing the control variables between differently orientated transmitter-receivers.

SHORT DESCRIPTION OF THE REFERENCE SYMBOLS 100 generator/oscillator
101 transmit antenna for radio waves
102 transmitted radio waves, possibly with varying polarisation properties
103 anisotropic transducer
104, 105 receive antenna for differently polarised radio waves (e.g. s- and p-pol.)
106 receiver and signal processing circuit
107, 108 differently polarised parts of the received radio waves
109 angle between antennas, e.g. 45°
200 generator/oscillator
201 predominantly linearly polarised antenna, e.g. dipole
202 linearly polarised radio waves
203 helix antenna or other structure suitable for generating circularly polarised waves
204 circularly polarised radio wave
205 delay platelets, produces a phase difference which is different for different polarisation directions
206 circularly or elliptically polarised radio wave
300, 301 housing parts
302 radio-waves-absorbing material or structural component
303 anisotropic transducer (exemplary implementation from FIG. 4)
304 shaft or other component mechanically connected with 303
305 module with transmitter and receiver and possibly further components
306 transmit antenna
307, 308 receive antenna
309 assembly components, e.g. screws
310 transmitted radio waves
311, 312 received radio waves of varying polarisation
400 anisotropic area of the anisotropic transducer
401 radio-waves-absorbing material or structural component
402-405 asymmetrical components for extending the measuring range to 360°
410 assembly device, e.g. thread bore 420 embodiment according to the invention of transmitting and receiving units for radio waves (transmitters, receivers, antennas, evaluation elements)
421 transmit antenna
422, 423 receive antenna
424 transmitted radio waves
425, 426 received radio waves of varying polarisation
427 multiple reflected radio waves
430 additional sensor element for extending the measuring range to 360°
450 symbolically indicated circle sections of different thicknesses/height profiles for extending the measuring range to 360°
451 exemplary element for polarisation of radio waves: long narrow metal web with a preferred height (between 400 and 450) in multiples of a quarter of the wavelength of the radio waves
452 basic body, optionally permeable, absorbing or reflective. The exemplary lens-shaped form of the profile serves to reduce received multiple reflections
460 basic body with a device for mechanical fixing, part of 452 or separate, material as 452 or different
470 spatially distributed transmit/receive units for radio waves
471, 472 additional sensory units for extending the measuring range to 360°
473 optional recess in the anisotropic transducer, for example for fitting to a shaft
500, 505 anisotropic transducer (plate or view of a layout) with analogue location-dependent anisotropy. Spatial orientation, period lengths and other features may vary
501 embodiment according to the invention of transmit and receive units for radio waves (transmitters, receivers, antennas, evaluation elements)
502 anisotropic transducer (plate or view of a layout) with digital location-dependent anisotropy
503 shaft or other workpiece with a degree of freedom regarding rotation and/or shift
504 anisotropic transducer (plate or view of a layout) with spatially higher-frequency anisotropy (higher than 500, 505)
510 anisotropic transducer (plate or view of a layout) with location-dependent anisotropy in at least two different planes preferably spaced apart by at least a quarter wavelength of the radio waves
511, 512 anisotropic structure components in different planes of an anisotropic transducer
513 transmitter for radio waves
514 antenna for transmitted radio waves
515, 516 antenna for differently polarised radio waves
517 amplifier and evaluation elements
518, 519 differently polarised parts of transmitted or backscattered radio waves
520 indication of the rotary axis
521 indication of a shift along the axis
522 indication of the shift in two planes with consistent distance to the receivers 517
523 indication of a shift by changing the distance to the receivers 517 (classical radar distance measurement)
530 transmitted radio waves
600 configurable transmit/receive circuit, e.g. super-regenerative receiver
601 combined transmit and receive antenna
602 anisotropic transducer
603 transmitted/received radio waves
604 control unit
605 amplifier
606 track & hold, filter
607 analogue-digital converter
608 evaluation unit
609 re-amplified signal
610 filtered and/or buffered signal
611 digitised signal
612 output signal (e.g. angle in degrees)
613 observed signal on the configurable transmit/receive circuit
620, 621 control signals (residual vibration suppression pulse, amplification control signal)
622-624 control signal (activate T&H, activate ADC, activate evaluation unit)
625 curve of a measurement with strong echo
626 curve of a measurement with weak echo
630 comparator circuit
631 feedback signal
650 starting time of measuring
651 time of sampling the measured signal on 609
652 time of providing the measuring results 612

The invention claimed is:

1. A system for measuring an angle of rotation or a rotary speed comprising:
at least one transmitter of radio waves,
at least two receivers for radio waves, and
a transducer which is anisotropic for the radio waves coming from the transmitter,
wherein the anisotropic transducer is configured to be rotatable in relation to the receivers about a rotary axis,
wherein the receivers are polarisation-sensitive,
wherein the anisotropic transducer is permeable for the radio waves or reflects the radio waves transmitted by the transmitter to different degrees for different polarisations such that the radio waves coming from the transmitter are changed by the anisotropic transducer and the changed radio waves are received by the polarisation-sensitive receivers, and
wherein an evaluation circuit is provided, which is configured to provide a signal evaluation based on relative amplitudes of the signals of the polarisation-sensitive receivers, thereby giving an indication as to the polarisation of the received radio waves.

2. The system according to claim 1, wherein the transmitter is configured such that the radio waves coming from the transmitter are linearly polarised.

3. The system according to claim 1, wherein the transmitter is configured such that the radio waves coming from the transmitter are unpolarised or circularly polarised averaged over time.

4. The system according to claim 1, wherein the anisotropic transducer is permeable to varying degrees for the radio waves transmitted by the transmitter for different polarisations, and wherein the polarisation-sensitive receivers are configured such that they can receive the radio waves let through by the anisotropic transducer.

5. The system according to claim 1, wherein the anisotropic transducer is configured such that it reflects the radio waves transmitted by the transmitter for different polarisations to varying degrees, and the polarisation-sensitive receivers are configured such that they can receive the radio waves reflected from the anisotropic transducer.

6. The system according to claim 1, wherein the anisotropic transducer is structurally separate from the rest of the device.

7. The system according to claim 1, wherein transmitters and receivers of radio waves are integrated.

8. The system according to claim 1, wherein transmitters and receivers, together with means for activating an actuator and for comparing the polarization of the received radio waves, are arranged so as to interact with a set value.

9. The system according to claim 1, wherein:
the anisotropic transducer comprises a structural asymmetry,
the receivers of radio waves are suitable for measuring the structural asymmetry, and
wherein the structural asymmetry is configured such that the angle of rotation of the anisotropic transducer can be unequivocally measured in a 360° interval based on the combination of all measured signals of the device.

10. The system according to claim 1, wherein:
the anisotropic transducer comprises a structural asymmetry,
at least one further sensory component for measuring the structural asymmetry exists, and
wherein the structural asymmetry is configured such that the angle of rotation of the anisotropic transducer can be unequivocally measured in a 360° interval based on the combination of all measured signals of the device.

11. The system according to claim 1, wherein the anisotropic transducer is shaped in such a way that multiple reflections on the receivers are attenuated.

12. A system for measuring an angle of rotation or a rotary speed with a configurable transmitter-receiver for polarised radio waves, comprising:
an antenna for polarised radio waves,
a transmit amplifier,
a receive amplifier, and
a transducer being anisotropic for the transmitted radio waves,
wherein the anisotropic transducer is configured to be rotatable about a rotary axis in relation to the transmitter-receiver,
wherein transmit and receive amplifiers have shared switching components,
wherein the anisotropic transducer is permeable for the radio waves or reflects the radio waves transmitted by the transmitter to different degrees for different polarisations such that the radio waves transmitted from the transmitter-receiver are changed by the anisotropic transducer and the changed radio waves are received by the same antenna,
wherein an evaluation circuit is provided, which is configured to provide a signal evaluation based on relative amplitudes of the signals of the polarisation-sensitive receivers, thereby giving an indication as to the polarisation of the received radio waves.

* * * * *